United States Patent
Mjolsnes et al.

[11] Patent Number: 5,905,976
[45] Date of Patent: May 18, 1999

[54] SYSTEM OF SECURED PAYMENT BY THE TRANSFER OF ELECTRONIC MONEY THROUGH AN INTERBANK NETWORK

[75] Inventors: Stig Frode Mjolsnes; Rolf Michelsen, both of Trondheim, Norway; Marie-Joséphe Revillet, Verson; Aymeric De Solages, Caen, both of France

[73] Assignees: France Telecom, Paris; La Poste, Boulogne Billancourt, both of France; Sintef Delab, Trondheim, Norway

[21] Appl. No.: 08/684,309

[22] Filed: Jul. 17, 1996

[30] Foreign Application Priority Data

Jul. 19, 1995 [FR] France .................. 95 08754

[51] Int. Cl.$^6$ .................. G06F 17/60; H04L 9/00
[52] U.S. Cl. .................. 705/39; 380/24
[58] Field of Search .................. 705/39, 41, 44, 705/17; 380/23, 24, 25, 49; 235/379, 380

[56] References Cited

U.S. PATENT DOCUMENTS

| | | | |
|---|---|---|---|
| 5,224,162 | 6/1993 | Okamoto et al. | 380/24 |
| 5,261,002 | 11/1993 | Perlman et al. | 380/30 |
| 5,453,601 | 9/1995 | Rosen | 380/24 |
| 5,511,121 | 4/1996 | Yacobi | 380/24 |
| 5,557,518 | 9/1996 | Rosen | 380/24 |
| 5,559,887 | 9/1996 | Davis et al. | 380/24 |
| 5,577,121 | 11/1996 | Davis et al. | 380/24 |
| 5,671,280 | 9/1997 | Rosen | 380/24 |
| 5,677,955 | 10/1997 | Doggett et al. | 380/24 |
| 5,717,868 | 2/1998 | James | 705/39 |
| 5,745,886 | 4/1998 | Rosen | 705/39 |
| 5,768,385 | 6/1998 | Simon | 380/24 |

FOREIGN PATENT DOCUMENTS 0 542 298 A2  11/1992  European Pat. Off. .
0 590 861 A2  9/1993  European Pat. Off. .

OTHER PUBLICATIONS

Bürk et al.; *Value Exchange Systems Enabling Security and Unobservability*; Computers & Security; Dec. 1990; vol. 9, No. 8; pp. 715–721.

Camenish et al.; *An Efficient Electronic Payment System Protecting Privacy*; Lecture Notes in Computer Science; Nov. 1994; vol. 875, pp. 207–215.

Chaum et al.; *Untraceable Electronic Cash*; Lecture Notes in Computer Science; vol. 403, pp. 319–327.

Okamoto et al.; *Universal Electronic Cash*; Advances in Cryptology –CRYPTO '91; Jan. 1991; pp. 324–337.

Chaum; *Security Without Identification: Transaction Systems to Make Big Brother Obsolete*; Communications of the Assoc. of Computing Machinery; Oct. 1985; vol. 28, No. 10; pp. 1030–1044.

Chaum; *Achieving Electronic Privacy*; Scienfic America; Aug. 1992; vol. 267, No. 2; pp. 76–81.

*Primary Examiner*—Eric W. Stamber
*Attorney, Agent, or Firm*—Nilles & Nilles SC

[57] ABSTRACT

A system of payment by the transfer of electronic money and especially of electronic cheques with blind signatures comprises an interbank compensation unit, an interbank network, and a verification unit. The interbank compensation unit permits the transfer of electronic money between multiple bank units in payment of amounts owed therebetween arising from the electronic cheques. The interbank network links the interbank compensation unit to the multiple bank units, and enables the transfer of electronic cheques from a payment terminal to the interbank compensation unit. The verification unit is linked to the interbank compensation unit, and is capable of verifying the authenticity and the non-reutilization of electronic cheques which have already travelled through the interbank network after a first payment.

19 Claims, 2 Drawing Sheets

SYSTEM OF SECURED PAYMENT BY THE TRANSFER OF ELECTRONIC MONEY THROUGH AN INTERBANK NETWORK

BACKGROUND OF THE INVENTION

1. Field of the Invention

The present invention relates to a system of secured payment by the transfer of electronic money through an interbank network.

The term "electronic money" is understood to mean a digital piece of information representing a sum of money.

For users, this sum is recorded in a portable carrier that is conventionally called an electronic wallet.

The electronic wallet is an electronic device that usually takes the form of a microprocessor-based card. The internal working of the electronic wallet and its architecture are presently the subject of many publications and, hence, no further details shall be given about this device. What must be known is that, during an operation for loading or replenishing the wallet, the bank machine authorized to carry out this loading records a sum that makes the user's balance positive. This sum is reduced by the internal electronic circuitry as and when payments are made by the user. The sum is increased when he receives money.

The term "interbank network" is understood to mean the digital data transmission network that enables the transfer of electronic money which goes from a payment terminal up to an interbank monetary compensation unit. This unit sends an account credit message to the bank of the provider of the service and a debit message to the bank issuing electronic money.

2. Description of the Prior Art

Even though work on the development of electronic wallets is now reaching its final stages, it is still the case today that, apart from using coins and banknotes, there are only two possible modes of paying a tradesman or a provider of services: these are payment by cheque or payment order and payment by bank card. These modes are distinguished from each other by the form taken by the money (paper in one case and an electronic format in the other), but the principle of their use is the same.

The payment orders are given by the customer's bank. During a purchase, the customer issues a payment order for a given amount on behalf of the tradesman or provider of services. The tradesman or provider of services sends this order to his bank which is generally different from the customer's bank. The compensation system makes it possible to credit the tradesman's account and to debit the customer's account at their respective banks.

In compensation systems used at present, the customer's bank does not actually transfer the money to the tradesman's bank whenever a payment is recorded. If the two banks have set up bilateral contractual links, each of them records the amount that it owes the other. At the end of a predefined period, only the difference between the two sets of amounts totalized by each bank is transferred from one to the other. This difference is generally small as compared with the total flow of money theoretically exchanged between the two banks. This makes it possible to limit transfers of money.

In a multinational context such as exists at present, the agreements are not made on a bilateral bank-to-bank basis. Rather, each bank participating in the system enters into a comprehensive agreement with the compensation system. Each bank keeps an account with the compensation system, the balance of which is increased by the total amount of payment orders presented to this bank and decreased by the total amount of the payment orders issued by this bank and received by the other bank.

In this configuration, the bank plays the role of a collector of payment orders.

The bank that receives a payment order carries out a certain number of verifying operations: for cheques and universal payment orders, it is ascertained that there is a signature present and that there is consistency between the amount in figures and the amount in letters and, for amounts above a certain value of the cheque, the signature is verified against a reference signature of the holder of the account. For payments by bank card, a verification is carried out at the time of payment by the presenting of the confidential code (i.e. the customer's identity is verified), and the validity of the card is also verified.

However, these operations of verification are not sufficient. The signature on a cheque is authenticated only for amounts beyond a certain value (the ceiling varies according to the bank) and this verification provides no guarantee against forged signatures. In the case of the use of bank cards with magnetic tracks, false cards may be manufactured and the payment terminal may then consider the card to be authentic.

The system of compensation based on computer systems is not safe from error in the form of errors of entry on the part of an operator, embezzlement, etc. This principle of operation is furthermore based on mutual confidence among banking organizations.

This system can work only on a relatively small scale. It is difficult to have a worldwide system of compensation. It would therefore be necessary to have a distributed banking architecture and a use of payment orders that is as localized as possible.

In national electronic payment systems, whether they are currently in use or forthcoming, the transactions recorded at each payment terminal are not stored individually but totalized in what is commonly called a security module.

For the bank, it is not possible to verify each transaction individually as is done with standard methods of payment. For, with the totalizing of the transactions, the notion of a cheque and/or a payment order disappears as does the notion of individual transactions.

The integrity and authenticity of the payments rely on the customer's electronic wallet card and on the security module located in the tradesman's terminal.

Now, recent developments pertaining to the electronic wallet provide for the possibility, during an operation of loading by authorized machines placed in certain banks or public places (post offices, etc.), for the loading also of electronic payment orders.

To simplify the description, these payment orders shall hereinafter be called cheques and these authorized machines shall hereinafter be called issuing banks.

Thus, in these developments, a sum of money M will be recorded in the balance contained in the wallet and several electronic cheques will be loaded into another part of the memory of the wallet. The number of cheques could, for example, be chosen by the user or by the issuing bank within fixed limits or it could be fixed beforehand without any choice being possible.

An electronic cheque that has just been loaded takes the form of a digital information element which reflects the identity of the issuing bank and the wallet without, however, revealing it, the signature being called a blind signature.

This information element actually comprises a first electronic signature Sqb enabling the authentication of the issuing bank and a second signature Sc enabling the card to be authenticated without the identity of the card appearing in the open.

The signatures computed and recorded for each card are distinct. They are obtained by a standard electronic signature algorithm that brings into operation, in addition to a function of signature generation with a secret key and a public key, one or more different random elements for each cheque.

For the generation of signatures, an algorithm such as the RSA (Rivest-Shamir-Adleman) algorithm is used.

It is also possible to use an algorithm published by the US Institute of Standards and Technology such as the DSA (Digital Signature Algorithm) or another signature protocol such as the Schnorr algorithm.

To obtain blind signatures, an algorithm that makes the signatures blind is added to these signature generating algorithms. For this purpose, it is possible for example to use the algorithm developed by David Chaum. The generation of blind electronic signatures forms part of known techniques.

In the context of these developments, a new problem is coming up. This is the problem of verifying that the cheques are authentic and that an electronic cheque which has already travelled through the bank network is not reused after a first payment.

An object of the present invention is to resolve this problem. It makes it possible to prevent and/or detect the manufacture of counterfeit electronic money.

The present invention furthermore makes it possible to preserve an anonymous character for money in circulation.

SUMMARY OF THE INVENTION

An object of the present invention is a system of payment by the transfer of electronic money and especially of electronic cheques with blind signature through the interbank network wherein chiefly said system comprises a unit for the verification of the authenticity and of the non-reutilization of electronic cheques, this unit being linked to the bank compensation unit of the network.

According to another object of the invention, the verification unit has processing means to carry out operations of authentication and operations to compare the electronic signatures of cheques received with already recorded signatures.

According to another object of the invention, the processing means furthermore make it possible to carry out a search for the identity of the signer of cheques that have been used several times.

According to another object of the invention, the verification unit comprises means for the storage of the electronic cheques transferred by the network during a collection operation.

According to another object of the invention, the verification unit comprises means to store a black list in which non-authenticated or reutilized electronic cheques are recorded.

According to a preferred embodiment, the compensation unit has an entity enabling a routing of the information elements received from the collection unit, and a compensation entity.

The compensation entity has processing means and storage means enabling the determining and recording of the debit operations of each issuing bank and the credit operations of each collecting bank.

The collecting bank has processing and storage means to carry out a test of consistency of the information elements collected and, on the basis of these information elements, to store the electronic cheques accepted after this test.

The collecting bank furthermore comprises a processing and storage entity enabling the recording of all the electronic cheques that are processed by the verification unit and found to be valid as well as an updating of the accounts for each tradesman who is a customer of this bank.

BRIEF DESCRIPTION OF THE DRAWINGS

The present invention shall be understood more clearly from the following description, given by way of a non-restrictive example with reference to the appended figures, of which.

DETAILED DESCRIPTION

Throughout the rest of the present description, the terms issuing bank BE or collecting bank BC shall be used to designate the respective information processing units of these banks. These units may advantageously consist of microcomputers connected to the interbank transmission network.

It is also clear that each issuing bank may be a collecting bank for certain customers and an issuing bank for other customers. Similarly, each collecting bank may be an issuing bank for certain customers and a collecting bank for other customers.

The term "customer" shall be used to designate any user of an electronic wallet. The term "tradesman" shall be used to designate any provider of services comprising a terminal for payment by electronic wallet.

Figure 1:
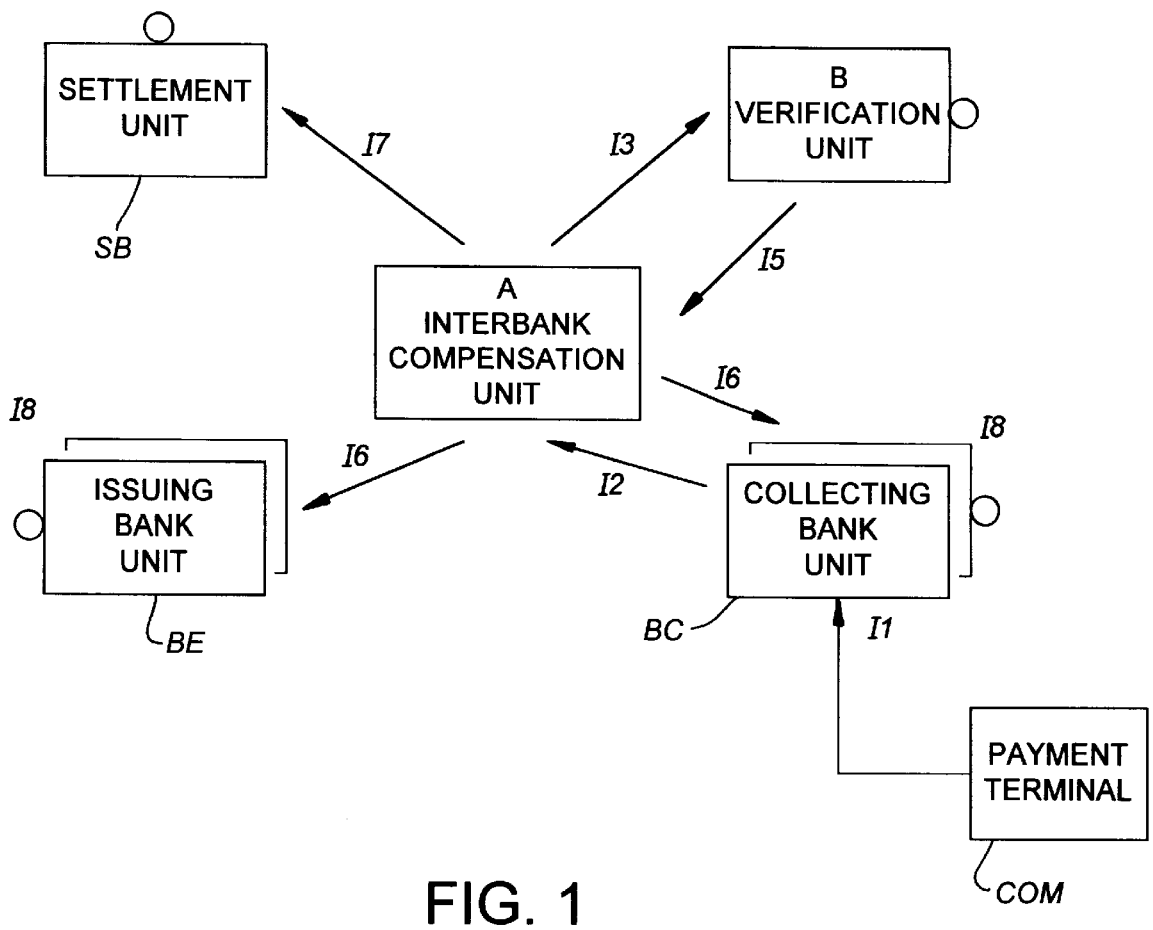
FIG. 1 shows a schematic drawing of the system according to the invention.

FIG. 1 therefore shows an issuing bank unit BE, a collecting bank unit BC, a payment terminal COM placed at a tradesman's premises, a compensation unit A, a verification unit B and a settlement unit SB.

Each unit advantageously consists of a microcomputer type processing system. This system is placed in the banks as far as the units BE or BC are concerned or in an authorized bank type organization as far as the units SB, B and A are concerned. The units COM are of course placed at the tradesman's premises.

The references I1 to I7 show the transfers of information in the order in which they are done.

The transfers between the compensation unit and the other units are carried out by the interbank transmission network. The exchanges between the different entities of the compensation unit may be done either by a network (for example a local network) or by a database.

The unit SB carries out the settlement orders. This unit balances the accounts between the issuing bank and the collecting banks with a view to carrying out operations of verification on the flow of money.

According to the invention, the system furthermore has the unit B for verifying the authenticity of the electronic cheques and their non-reutilization. This unit is connected to the compensation unit.

The following is the operation of the payment system.

A customer who is the bearer of an electronic wallet card carries out a withdrawal operation at an issuing bank unit (which is not necessarily a bank). In its balance, the wallet contains a data element representing the amount M and several electronic cheques Ch1, Ch2, . . . , etc.

The cheque Ch1 takes the form of a digital signature Sbq1 and a digital signature Sc1 which, and this is given by way of an example, will take the form:

Sbq1=f(K1, Dp) and Sc1=f(K2, Dc), should they be generated from the RSA algorithm.

K1 and K2 are secret keys associated with public keys Kpb and Kpc, Dp is a data element identifying the bank and Dc is a data element identifying the electronic wallet card.

During a purchase, the customer sends electronic money to the terminal COM. For this purpose, the card transmits the signatures Sbq and Sc of a cheque and computes a third payment signature Sp enabling the amount of the cheque to be authenticated.

Naturally, for this purpose, the card has all the resources (programs and computations means) needed to implement the computation of a signature. This implementation brings into operation the signature algorithm f with the secret key Kc and the public key Kf. The card has the pair (Kc, Kf) needed for this computation, the data element Dp identifying it and the amount of the cheque.

In the case of generation for the algorithm RSA, the signature takes the form: Sp=f(Kc, M, Dp).

The terminal receiving the cheque could then authenticate the cheque without knowing the identity of the card but would not be able to find out whether it is a case of dual use of the cheque.

The balance contained in the card is reduced by the value of the cheque issued.

The electronic cheques received by the terminal COM are transmitted individually to the collecting bank BC which corresponds to the transfer of the information elements I3 to the unit B.

The unit B then sends a reply information element I5 to the unit A which can thus update a list of the debit operations for the issuing bank and the list of the credit operations for the collecting bank. This unit A can then send settlement requests I7 to the settlement unit SB, debit messages I6 to the issuing bank BE as well as credit messages I6 to the collecting bank BC.

All these transfers and processing operations shall be described in detail hereinafter in the description with reference to FIG. 2.

Figure 2:
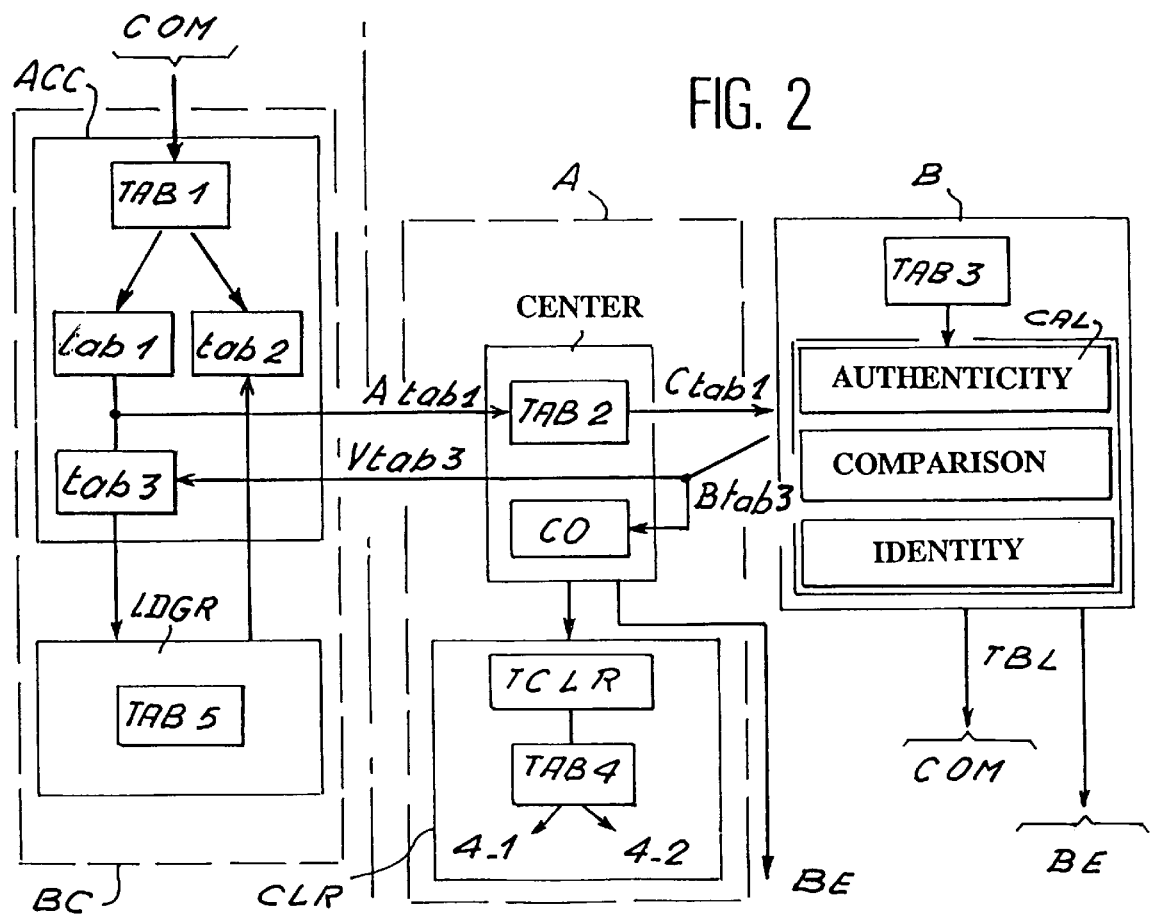
FIG. 2 shows a more detailed drawing of the system.

FIG. 2 gives a detailed view of the different functional entities and the exchanges of information between these entities. The collecting bank BC has a functional entity ACC that receives the deposit requests and stores the electronic cheques to be credited in a table TAB1 that has a part tab1 reserved for deposit operations and a part tab2 reserved for rejected cheques. The bank BC furthermore carries out a first test of consistency on the information received. This is a test of the format of the data elements (a verification of the number of bits received with respect to the number expected).

The contents of tab1 are transferred in the form of a message Atab1 to the unit A and more specifically towards the entity CENTER which transmits the contents of this table to the unit B after having recorded these contents, if necessary, in a table TAB2. The message Ctab1 corresponding to the contents of this table is received and processed by the unit B as described in detail here below.

The unit B carries out a first verification of the digital cheques received. This verification consists of an authentication of the signatures. It is a cryptographic verification to make sure that the signatures Sqb1, Sc1 and Sp are authentic.

This verification is done in a standard way by means of the verification function appropriate to the signature generation algorithm used. In the case of the RSA algorithm, the operation uses the inverted function of the function f that has served to prepare the signature and the public key associated with the secret key K of the bank or of the card as the case may be.

Thus, for a given cheque ch1 and if we denote the inverted function of f as f', it is verified that:

$$f'(kpb, Dq, Sqb1)="OK"$$

and that $f'(Kpc, Dc, Sc)="OK"$.

The result could, for example, take the form of a bit 1 or 0 which will correspond, depending on the convention adopted, to a positive result (authenticated signature) or negative result (rejected signature).

After this first test of authenticity, the unit B makes a comparison, for each cheque received, of the values of the signatures Sbq, Sc with values recorded as and when the contents of the table tab1 are received.

In practice, for a cheque Ch1, the value of the signatures Sbq1 and Sc1 will be compared with the signatures already recorded in a table TAB3. This table is updated as and when information elements Ctab1 arrive.

At the end of the result of these comparisons, the cheques are considered to be cryptographically valid (authenticated) and used only once.

A cheque has been used only once if, after comparison with the contents of the table TAB3, no identical signatures Sbq1 and Sc have been found.

The cheques that are valid and that have been used only once are forwarded to the collecting bank BC via the entity CENTER in the form of an information element Btab3 received by this entity at the bank BC. The entity CENTER makes a copy of the contents CO of Btab3. This copy is sent to an entity CLR which has a table TAB4 consisting of two tables 4-1 and 4-2. The table 4-1 enables the storage of the debit operations and the table 4-2 enables the storage of the credit operations.

This entity CLR prepares the list of the debit operations (for the issuing banks) and credit operations (for the collecting banks) for each bank account and periodically carries out an operation of compensation between these different banks by sending the information to the settlement unit SB.

Furthermore, the entity CENTER also sends the issuing banks BE a copy of the table of the cheques that are found to be valid and have been used only once.

The table tab3 received by the entity ACC by means of the information element Vtab3 is sent to an entity LDGR.

This entity records all the cheques that are processed and found to be valid in a table TAB5 and also updates the accounts for every tradesman who is a customer of the bank for the recording of his new balance.

Should the entity B detect a cheque that is non-authenticated or has already been used, this cheque is recorded in a table TBL corresponding to a black list (of forged cheques). This list is sent to the payment terminals COM during a collection that follows. This operation enables the updating of the black list of these terminals. These terminals will then be able to reject cheques that are already on the black list when they carry out a procedure for the authentication of the cheque transmitted by a payment card.

Thus, according to the invention, the system enables payments to be made by electronic cheques in a secured way without even having knowledge the identity of the bearer of the electronic wallet card who has issued the cheque. For, indeed, just as in the case of payment made with conventional money, payment with electronic money and even payment by an electronic cheque is made without knowledge of the payer's identity.

However, there is provision for the performance of a third processing operation by the entity B. In this third processing operation, two cheques having the same signatures Sbq and Sc but different signatures Sp would be compared in order to retrieve the payer's identity.

Indeed, if Sp1 and Sp2 are the two signatures computed by a card when payment is made with a cheque Ch1 (Sbq1, Sc1) and when another payment is made with this same cheque Ch1 fraudulently duplicated by the bearer, then standard procedures for verifying these two signatures can be used to retrieve the concealed identity of these two signatures of the carrier (payer).

What is claimed is:

1. A system of payment by the transfer of electronic money and especially of electronic cheques with blind signature, the system comprising:

an interbank compensation unit, said interbank compensation unit permitting the transfer of electronic money between multiple bank units in payment of amounts owed therebetween arising from said electronic cheques;

an interbank network, said interbank network linking said interbank compensation unit to said multiple bank units, and said interbank network enabling the transfer of electronic cheques from a payment terminal to said interbank compensation unit; and a verification unit, said verification unit being capable of verifying the authenticity and the non-reutilization of electronic cheques which have already travelled through said interbank network after a first payment, said verification unit being linked to said interbank compensation unit.

2. A system of payment according to claim 1, wherein said verification unit includes processing means for carrying out operations of authentication and operations to compare electronic signatures of cheques received with already recorded signatures.

3. A system of payment according to claim 2, wherein said processing means furthermore make it possible to carry out a search for an identity of a signer of electronic cheques that have been used several times.

4. A system of payment according to claim 1, wherein said verification unit comprises means for storing the electronic cheques transferred by said interbank network during a collection operation.

5. A system of payment according to claim 1, wherein, said verification unit comprises means for storing a black list in which non-authenticated or reutilized electronic cheques are recorded.

6. A system of payment according to claim 1, wherein said interbank compensation unit has an entity enabling a routing of information elements received from a collecting bank, and a compensation entity.

7. A system of payment according to claim 6, wherein said compensation entity includes processing means and storage means enabling determining and recording of debit operations of each issuing bank and credit operations of each collecting bank.

8. A system of payment according to claim 6, wherein said collecting bank includes processing and storage means for carrying out a test of consistency of the information elements collected and, on the basis of these information elements, storing the electronic cheques accepted after this test.

9. A system of payment according to claim 8, wherein said collecting bank furthermore comprises a processing and storage entity enabling recording of all the electronic cheques that are processed by said verification unit and found to be valid as well as an updating of accounts for each tradesman who is a customer of this bank.

10. A method of payment by the transfer of electronic cheques, the method comprising:

receiving payment at a payment terminal, said payment being made in the form of one of said electronic cheques;

performing a first test to verify the authenticity of said electronic cheque at said payment terminal;

transferring said electronic cheque from said payment terminal to a collecting bank unit;

transferring said electronic cheque from said collecting bank unit to an interbank compensation unit by way of an interbank network, said interbank compensation unit permitting the transfer of electronic money between multiple bank units in payment of amounts owed therebetween arising from said electronic cheques, and said interbank network linking said interbank compensation unit to said multiple bank units; and performing a second test to verify the authenticity and the non-reutilization of said electronic cheque at a verification unit (1) after the first test to verify the authenticity of said electronic cheque has been performed at said payment terminal, and (2) after said electronic cheque has been transferred from said collecting bank unit to said interbank compensation unit by way of said interbank network.

11. A method according to claim 10, further comprising the step of carrying out operations of authentication and operations to compare electronic signatures of cheques received with already recorded signatures.

12. A method according to claim 11, further comprising the step of carrying out a search for an identity of a signer of electronic cheques that have been used several times.

13. A method according to claim 10, further comprising the step of storing the electronic cheques transferred by said interbank network during a collection operation.

14. A method according to claim 10, further comprising the step of storing a black list in which non-authenticated or reutilized electronic cheques are recorded.

15. A method according to claim 10, further comprising the step of routing information elements received from a collecting bank, said routing step being performed by said interbank compensation unit.

16. A method according to claim 15, further comprising the steps of determining and recording of debit operations of each issuing bank and credit operations of each collecting bank.

17. A method according to claim 15, further comprising the step of carrying out a test of consistency of the information elements collected and, on the basis of these information elements, storing the electronic cheques accepted after this test.

18. A method according to claim 17, further comprising the step of recording of all the electronic cheques that are processed by said verification unit and found to be valid and updating of accounts for each tradesman who is a customer of this bank.

19. A system of payment by the transfer of electronic cheques, the system comprising:

(A) a payment terminal, said payment terminal being capable of receiving a payment in the form of an electronic cheque and of performing a first test to verify the authenticity of said electronic cheque;

(B) multiple bank units, including
   (1) an issuing bank unit, and
   (2) a collecting bank unit, said collecting bank unit being coupled to said payment terminal and receiving said electronic cheque from said payment terminal;

(C) an interbank compensation unit, said interbank compensation unit permitting the transfer of electronic money between said multiple bank units in payment of amounts owed therebetween arising from said electronic cheques;

(D) an interbank network, said interbank network linking said interbank compensation unit to said multiple bank units, and said interbank network enabling the transfer of electronic cheques from said collecting bank unit to said interbank compensation unit; and (E) a verification unit, said verification unit being capable of performing a second test to verify the authenticity and the non-reutilization of electronic cheques which have already travelled through said interbank network after a first payment and which have already been authenticated at said payment terminal, said verification unit being linked to said interbank compensation unit.

* * * * *